United States Patent
Ding et al.

(10) Patent No.: US 10,031,004 B2
(45) Date of Patent: Jul. 24, 2018

(54) METHODS AND APPARATUS FOR WIDE RANGE MASS FLOW VERIFICATION

(71) Applicant: MKS Instruments, Inc., Andover, MA (US)

(72) Inventors: Junhua Ding, Boxborough, MA (US); Michael L'Bassi, Sterling, MA (US); Wayne Cole, Windham, NH (US)

(73) Assignee: MKS Instruments, Inc., Andover, MA (US)

( * ) Notice: Subject to any disclaimer, the term of this patent is extended or adjusted under 35 U.S.C. 154(b) by 27 days.

(21) Appl. No.: 15/380,682

(22) Filed: Dec. 15, 2016

(65) Prior Publication Data

US 2018/0172491 A1    Jun. 21, 2018

(51) Int. Cl.
   *G01F 1/34*    (2006.01)

(52) U.S. Cl.
   CPC ...................................... *G01F 1/34* (2013.01)

(58) Field of Classification Search
   CPC .................................. G01F 1/00; G01P 21/00
   See application file for complete search history.

(56) References Cited

U.S. PATENT DOCUMENTS

| | | | |
|---|---|---|---|
| 5,865,205 A | 2/1999 | Wilmer et al. | |
| 6,216,726 B1 | 4/2001 | Brown et al. | |
| 7,424,346 B2 | 9/2008 | Shajii et al. | |
| 7,461,549 B1 | 12/2008 | Ding et al. | |
| 7,463,991 B2 * | 12/2008 | Shajii | G01F 25/0038 702/100 |
| 7,474,968 B2 * | 1/2009 | Ding | G01F 25/0038 702/100 |
| 7,743,670 B2 | 6/2010 | Ahmed et al. | |

(Continued)

FOREIGN PATENT DOCUMENTS

| | | |
|---|---|---|
| DE | 3606756 A1 | 3/1986 |
| DE | 19857329 B4 | 12/1998 |

(Continued)

OTHER PUBLICATIONS

Notification of Transmittal of the International Search Report and the Written Opinion of the International Searching Authority, or the Declaration, for International Application No. PCT/US2017/065405, entitled: "Methods And Apparatus For Wide Range Mass Flow Verification," dated Mar. 16, 2018 (21 pages).

*Primary Examiner* — Jewel V Dowtin
(74) *Attorney, Agent, or Firm* — Hamilton, Brook, Smith & Reynolds, P.C.

(57) ABSTRACT

A mass flow verifier (MFV) that is space-efficient and can verify flow rates for unknown fluids over a wide range of flow rates includes a chamber configured to receive a fluid, a critical flow nozzle connected to the chamber, and first and second pressure sensors that, respectively, detect fluid pressure in the chamber and upstream of the critical flow nozzle. A controller of the MFV is configured to verify flow rate of the fluid by, (i) at a first flow range, measuring a first flow rate based on a rate of rise in pressure of the fluid as detected by the first pressure sensor and determining a gas property function of the fluid based on pressures as detected by the first second pressure sensors, and (ii) at a second flow range, measuring a second flow rate based on pressure detected by the second pressure sensor and the determined gas property function.

28 Claims, 7 Drawing Sheets

(56) References Cited

U.S. PATENT DOCUMENTS

| | | | |
|---|---|---|---|
| 7,757,554 B2* | 7/2010 | Ding | G01F 22/02 73/239 |
| 7,853,416 B2 | 12/2010 | Nakada et al. | |
| 7,891,228 B2 | 2/2011 | Ding et al. | |
| 8,646,307 B2* | 2/2014 | Yasuda | G01F 1/36 702/113 |
| 8,793,082 B2 | 7/2014 | Ding et al. | |
| 8,826,935 B2 | 9/2014 | Nakada et al. | |
| 8,997,686 B2* | 4/2015 | Ding | C23C 16/448 118/695 |
| 9,057,636 B2 | 6/2015 | Nagai et al. | |
| 2002/0124660 A1 | 9/2002 | Drzewiecki | |
| 2004/0261492 A1* | 12/2004 | Zarkar | G01F 25/0038 73/1.34 |
| 2006/0005882 A1* | 1/2006 | Tison | G01F 25/0038 137/487.5 |
| 2006/0123921 A1* | 6/2006 | Tison | G01F 7/005 73/861 |
| 2014/0083514 A1 | 3/2014 | Ding et al. | |
| 2016/0025912 A1 | 2/2016 | Lijima et al. | |

FOREIGN PATENT DOCUMENTS

| | | |
|---|---|---|
| KR | 20120041291 A | 5/2012 |
| WO | 95/32405 A1 | 11/1995 |

* cited by examiner

METHODS AND APPARATUS FOR WIDE RANGE MASS FLOW VERIFICATION

BACKGROUND

Mass flow verifiers (MFVs) are used to verify the accuracy of fluid delivery and measurement systems. Such systems include, for example, mass flow controllers (MFCs), mass flow ratio controllers (FRCs), and mass flow meters (MFMs) in semiconductor fabrication systems and other materials processing systems.

A semiconductor fabrication process can involve the delivery of several different gases and gas mixtures in various quantities over several processing steps. Generally, gases are stored in tanks at a processing facility, and gas metering systems are used to deliver metered quantities of gases from the tanks to processing tools, such as chemical vapor deposition reactors, vacuum sputtering machines, plasma etchers, etc. Other components, such as valves, pressure regulators, MFCs, FRCs, MFMs, MFVs, and the like can be included in the gas metering system or in a flow path from the gas metering system to a processing tool. Components such as MFCs, FRCs, MFMs, and MFVs are provided to ensure the precise delivery of process gases. As space is often at a premium in such processing systems it is desirable that components be as small or as space-efficient as possible.

SUMMARY OF THE INVENTION

Mass flow verifiers capable of verifying the accuracy of fluid delivery systems over a wide range of flow rates without requiring a large footprint in a processing system are desirable.

A mass flow verifier includes a chamber configured to receive a fluid, a critical flow nozzle in fluid connection with the chamber, first and second pressure sensors and a controller. The first pressure sensor detects fluid pressure in the chamber, and the second pressure sensor detects fluid pressure upstream of the critical flow nozzle. The controller is configured to verify flow rate of the fluid by, at a first flow range, measuring a first flow rate based on a rate of rise in pressure of the fluid as detected by the first pressure sensor. The controller is further configured to verify the flow rate of a fluid by, at a second flow range, measuring a second flow rate based on pressure detected by the second pressure sensor. The critical flow nozzle can be in serial fluid connection with the chamber and can be located upstream of the chamber.

A method of verifying a flow rate includes, for a flow rate in a first flow range, introducing a fluid into the chamber of the mass flow verifier and detecting pressure of the fluid in the chamber over time. The first flow rate is calculated based on a rate of rise in pressure of the fluid in the chamber. The method further includes, for a flow rate in a second flow range, detecting pressure of the fluid upstream of the critical flow nozzle of the mass flow verifier and calculating the second flow rate based on the detected upstream pressure.

In some instances, the gas or gas mixture being tested may be unknown. Mass flow verifiers capable of verifying flow rates for unknown gases or gas mixtures (or other fluids and fluid mixtures) are also desirable. In such instances, a flow rate through a critical flow nozzle can be equated to a flow rate as detected in a chamber of the mass flow verifier to obtain a gas property function of the gas or gas mixture. Even where a gas or gas mixture is known, mass flow verifiers capable of determining a gas property function can improve the accuracy of mass flow verification performed using critical flow nozzle methods.

The controller of a mass flow verifier can be further configured to determine a gas property function of the fluid based on pressures as detected by the first and second pressure sensors during verification of a flow rate in the first flow range. At a second flow range, the controller can be configured to measure the second flow rate based on pressure as detected by the second pressure sensor and the determined gas property function.

A method of verifying a flow rate can further include determining a gas property function of the fluid based on pressures as detected by the first pressure sensor and the second pressure sensor. The method can also include calculating the second flow rate based on the detected upstream pressure and the determined gas property function.

A method of increasing an operational flow range of a mass flow verifier includes, for low flow rates, utilizing a rate of rise method to determine a flow rate of a fluid. The method further includes, for middle flow rates, utilizing a rate of rise method to determine a flow rate of the fluid and determining a gas property function of the fluid. For high flow rates, the method includes utilizing a critical flow nozzle method with the determined gas property function to determine flow rate of the fluid.

The controller of a mass flow verifier can be further configured to select between obtaining a rate of rise measurement and a critical flow nozzle measurement for verifying subsequent flow rates of the fluid. For example, the controller can be configured to select obtaining a rate of rise measurement for low flow rates and/or to select obtaining a critical flow nozzle measurement for high flow rates. A low flow rate can include a range of flow rates of about 1 sccm to about 1000 sccm, and a high flow rate can include a range of flow rates of about 1,000 sccm to about 50,000 sccm.

The controller of a mass flow verifier can be further configured to calculate the first flow rate $Q_v$, according to a rate of rise measurement. A rate of rise measurement can be expressed as:

$$Q_v = V \cdot \frac{d\left(\frac{P_d}{T}\right)}{dt} \quad (1)$$

where V is a volume of the chamber, $P_d$ is the detected pressure of the fluid in the chamber, and T is a detected temperature of the fluid. The controller can also be configured to calculate the gas property function based on a temperature of the fluid and known geometry of the critical flow nozzle. For example, the controller can be configured to determine the gas property function $f(M,\gamma)$, which is based on a molecular weight M and a specific heat ratio $\gamma$ of the fluid, according to:

$$f(M, \gamma) = V \cdot \frac{\frac{d(P_d/T)}{dt}}{C' \cdot A \cdot \sqrt{T} \cdot P_u} \quad (2)$$

where $P_u$ is the detected pressure of the fluid upstream of the critical flow nozzle, C' is a discharge coefficient of the critical flow nozzle, and A is a cross-sectional area of the throat of the critical flow nozzle. The second flow rate, $Q_c$, can be calculated according to a critical flow nozzle measurement. A critical flow nozzle measurement can be expressed as:

$$Q_c = C' \cdot A \cdot P_u \cdot \sqrt{T} \cdot f(M, \gamma). \tag{3}$$

The first flow range and the second flow range can include overlapping flow rates.

A mass flow verifier can also include a downstream valve located at an outlet of the chamber and the controller can be configured to close the downstream valve causing fluid pressure within the chamber to rise. A temperature sensor can also be included in the mass flow verifier and the first and second flow rates can be further based on a detected temperature of the fluid. A chamber in a mass flow verifier can have a volume of about 3 L or less, or of about 1 L or less. A plurality of parallel critical flow nozzles can be in fluid connection with the chamber, with at least two critical flow nozzles having different cross-sectional throat areas. The controller can be further configured to selectively activate one of the plurality of critical flow nozzles by opening an upstream valve associated with the selected critical flow nozzle and closing upstream valves associated with other critical flow nozzles. A critical flow nozzle can also be configured to provide external volume insensitivity during rate of rise measurements, such as, for example, the first flow rate. A controller can be configured to measure the first flow rate within a critical flow period during which time flow rate of the fluid through the critical flow nozzle is substantially constant and substantially insensitive to variations in pressure within the chamber.

A method of verifying a flow rate can include selecting between obtaining a rate of rise measurement and a critical flow nozzle measurement for measuring subsequent flow rates of the fluid. For example, a rate of rise measurement can be selected for a relatively low flow rate and a critical flow nozzle measurement can be selected for a relatively high flow rate. The method can further include selecting among a plurality of critical flow nozzles for measuring subsequent flow rates of the fluid. The fluid can be an unknown gas or mixture of gases. The detection of pressure of the fluid within the chamber can occur within a critical flow period, such that rate of rise measurements are obtained that are substantially insensitive to an external volume.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Mass flow verifiers (MFVs) that utilize both rate-of-rise (ROR) measurement techniques and critical flow nozzle (CFN) measurement techniques are provided. As further described below, MFVs can include a chamber volume for use in an ROR measurement and a critical flow nozzle for use with a CFN method. Pressure sensors are included in the MFV that can be common to both the ROR and CFN measurement methods.

Figure 1A:
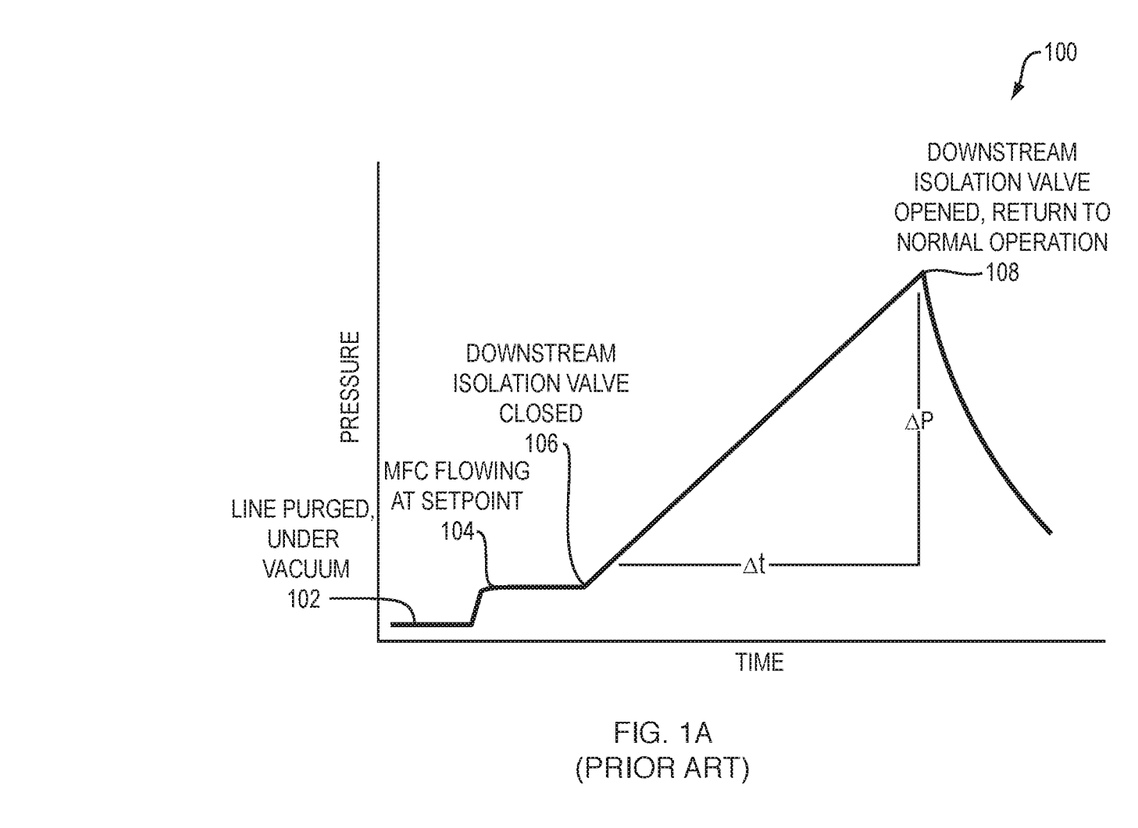
FIG. 1A is a graph illustrating a pressure vs. time response during a rate-of-rise flow verification method.
Figure 1B:
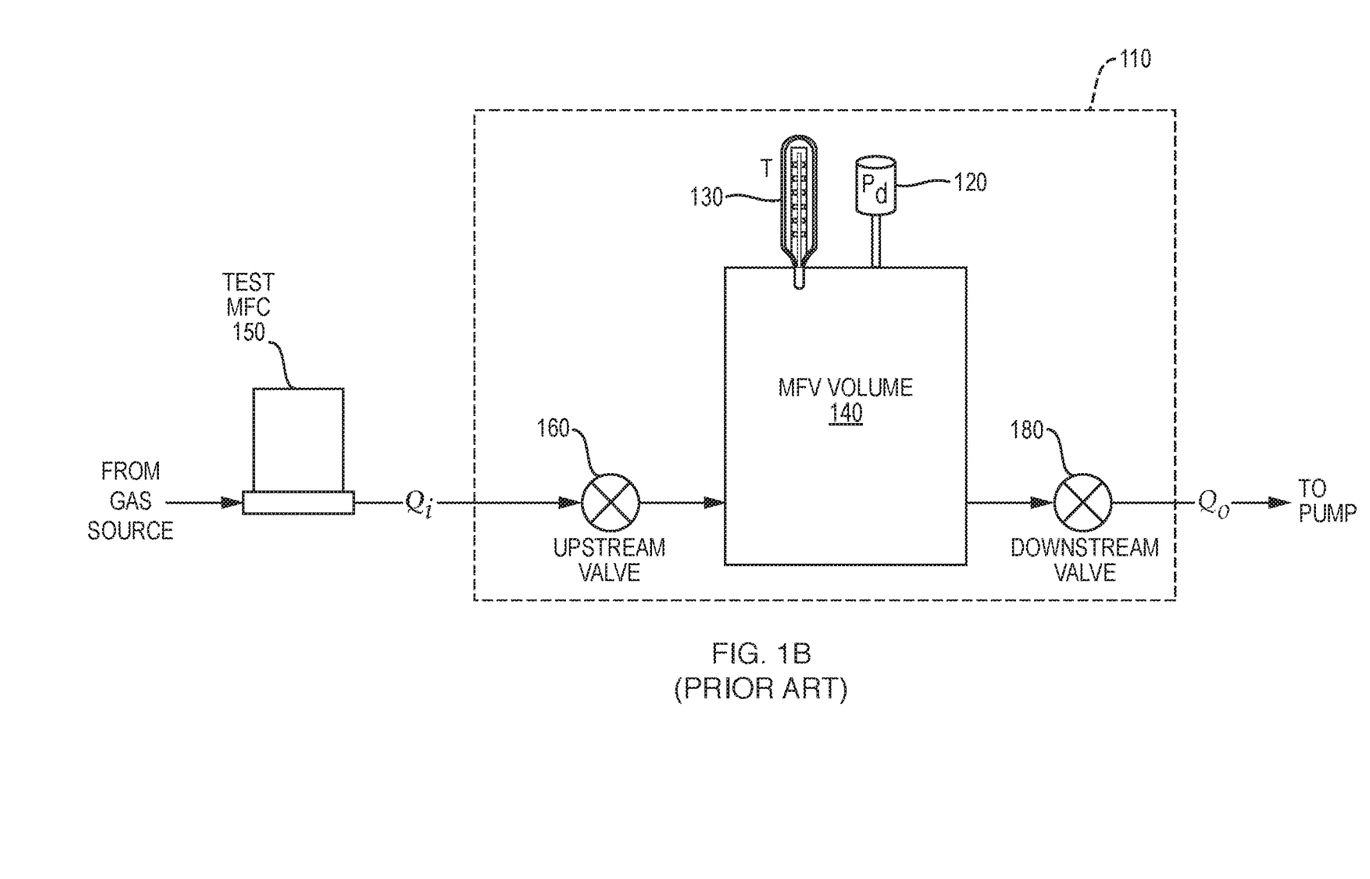
FIG. 1B is a schematic of a prior-art mass flow verifier.

ROR measurement techniques are known in the art and make use of a pressure (P) vs. time (t) response 100 of a gas introduced into a known volume, as illustrated in FIG. 1A. An example prior art MFV 110 is illustrated in FIG. 1B. To verify the flow rate of a gas from a device under test (DUT) 150, such as, for example, a Mass Flow Controller (MFC), prior art MFVs have included a chamber 140 providing a known volume, a valve 160 located upstream of the chamber 140, and a valve 180 located downstream of the chamber 140. Initially, the device 110 may be purged (step 102, FIG. 1A) by closing upstream valve 160, opening downstream valve 180, and applying a vacuum pump. After the device 110 has been purged, upstream and downstream valves 160 and 180 can be opened, allowing a flow of gas ($Q_1$) to enter the device 110. The process further includes an initialization period in which the flow of gas from the DUT 150 is allowed to stabilize to a setpoint (step 104, FIG. 1A). The downstream valve 180 is then closed (step 106, FIG. 1A), causing gas to fill the chamber 140 over a period of time ($\Delta t$) and a change in pressure ($\Delta P$) to occur. During this period, pressure and temperature measurements are obtained by pressure sensor 120 and temperature sensor 130. Upon opening of the downstream valve 180 (step 108, FIG. 1A), a flow of gas ($Q_o$) exits the device 110 and normal delivery of the gas from the DUT to a processing tool is allowed to resume.

Pressure and temperature measurements obtained during the ROR test can be used to calculate the gas flow rate in accordance with the following equation:

$$Q_v = \frac{V_c T_{stp}}{P_{stp}} \frac{d}{dt}\left(\frac{P_d}{T}\right) \tag{4}$$

where $Q_v$ is the gas flow rate into the MFV, $V_c$ is the volume of the chamber of the MFV, $T_{stp}$ is the standard temperature (273.15° K.), $P_{stp}$ is the standard pressure (1.01325×10$^5$ Pa), $P_d$ is the measured pressure within the chamber, and T is the measured temperature. ROR measurement methods and devices are further described in U.S. Pat. No. 7,461,549 and U.S. Pat. No. 7,757,554, the entire contents of which are incorporated herein by reference.

As ROR measurement methods and devices involve the use of a chamber having a volume large enough to accommodate an inflow of gas over a period of time, the utility of such methods and devices is often limited to applications involving relatively low flow rates (e.g., flow rates of about 1000 standard cubic centimeters per minute (sccm) of $N_2$ equivalent or less). Higher flow rates require larger chamber volumes, which can be impractical in many processing systems due to space limitations. Even where a processing system can provide the space to accommodate an MFV with a larger chamber volume, the use of a larger chamber can result in imprecision with respect to relatively low flow rates. As such, MFVs utilizing ROR techniques are often tailored to verify flow rates within relatively narrow ranges.

Additionally, when MFVs are used to provide in situ flow verification, as is typical, gas flow to the processing tool is interrupted for a period of time. The period of time for which gas flow to the processing tool is interrupted includes the time required to purge the line so as to provide an initially empty chamber volume, the time during which the gas flow is allowed stabilize, and the time over which measurements are obtained (i.e., Δt), as illustrated in FIG. 1A. Larger chamber volumes may also be undesirable for relatively low flow rates as they can result in greater interruptions to processing time.

However, an advantage of ROR measurement techniques is that they can be applied without knowledge of the specific gas or gas mixture being measured. Equation 4, derived from a mass balance over the chamber volume and an application of the ideal gas law, is gas independent, relying on the three state variables of pressure (P), temperature (T), and volume (V) to characterize the behavior of the gas being measured.

Critical flow nozzles, also known as flow restrictors and sonic nozzles, are known in the art and are used to provide a choked flow to a gas stream, where mass flow of the gas does not increase upon a further decrease in pressure downstream from the nozzle.

For a choked flow condition to apply, the ratio of a downstream pressure ($P_d$) to an upstream pressure ($P_u$) must be less than a critical pressure ratio that is determined by the properties of the gas flowing through the critical flow nozzle, as provided by:

$$\frac{P_d}{P_u} < \left(\frac{2}{\gamma+1}\right)^{\gamma/(\gamma-1)} \quad (5)$$

where γ is the ratio of specific heats of the gas. The ratio of specific heats is defined as $\gamma = C_p/C_v$, where $C_p$ is the heat capacity of the gas at constant pressure and $C_v$ is heat capacity of the gas at constant volume.

Critical flow nozzles have been used in flow verification technologies. For example, critical flow nozzles have been used to improve the accuracy of ROR measurements by maintaining a constant flow into an WV chamber and minimizing downstream pressure disturbances to a DUT, as described in U.S. Pat. No. 7,474,968 and U.S. Pat. No. 7,757,554.

CFN methods and devices can be used independently of ROR-based methods and devices to verify flow rates where properties of a gas or gas mixture are known. Flow rate ($Q_c$) through a choked flow nozzle can be expressed as:

$$Q_c = C' \cdot A \cdot P_u \cdot \left(\frac{R \cdot T}{M} \frac{2\gamma}{\gamma+1}\right)^{1/2} \cdot \left(\frac{2}{\gamma+1}\right)^{\gamma/(\gamma-1)} \quad (6)$$

where C' is a discharge coefficient of the CFN, A is a cross-sectional area of the CFN, R is the universal gas constant, M is the molecular weight of the gas, and T is the temperature of the gas.

Equation 6 can be alternatively expressed as Eq. (3), reproduced here:

$$Q_c = C' \cdot A \cdot P_u \sqrt{T} \cdot f(M,\gamma) \quad (3)$$

where $f(M,\gamma)$ is a gas property function based on the gas-specific parameters of molecular weight (M) and specific heat ratio (γ). As can be seen from Equation 3, the flow rate ($Q_c$) of a gas through a critical flow nozzle can be determined based on a measured upstream pressure ($P_u$) and a measured temperature (T) of the gas, provided that the critical flow nozzle geometry and gas properties are known.

An advantage of CFN measurement techniques is that measurements can be obtained quickly and without interruption of gas flow to the processing tool. Additionally, critical flow nozzles are generally small in size and therefore do not require a large amount of space in a processing system. However, CFN methods are not ideal for the measurement of gas flow in relatively low flow ranges even with critical flow nozzles with increasingly smaller cross-sectional areas. It is difficult to maintain the choked flow condition as gas flow rates lower. As such, CFN methods are typically used for the measurement of gas flow in relatively high flow ranges where the gas or gas mixture is known.

Figure 2:
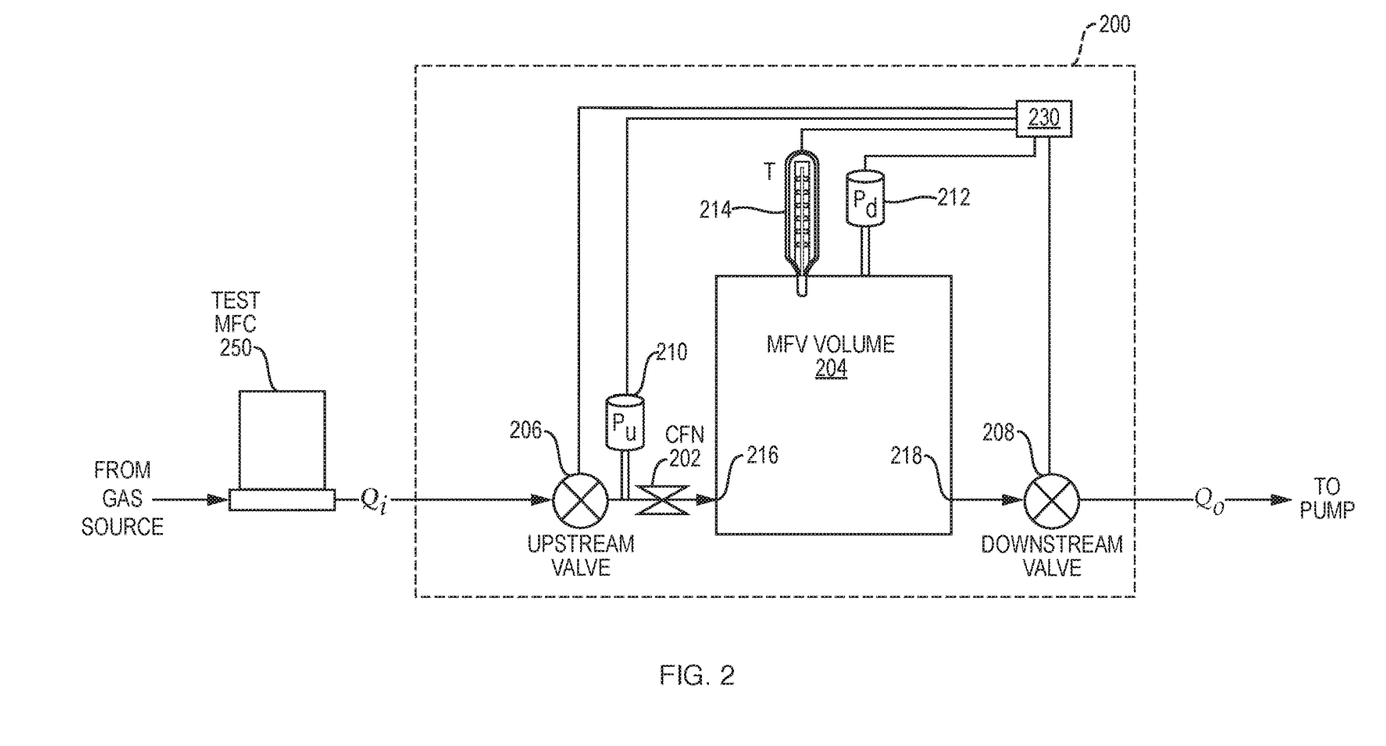
FIG. 2 is a schematic of a mass flow verifier including a critical flow nozzle and a chamber volume.

FIG. 2 illustrates an MFV 200 that includes both a critical flow nozzle 202 for use with CFN measurement methods and a chamber 204 for use with ROR measurement methods, thereby providing adaptability for use with low to high flow ranges. MFV 200 also includes valves 206, 208, pressure sensors 210, 212, and a temperature sensor 214, each of which is connected to a controller 230. The upstream valve 206 is in fluid connection with an inlet 216 of the chamber 204, and the downstream valve 208 is in fluid connection with an outlet 218 of the chamber 204.

For flow rates within a first flow range, a flow rate $Q_v$ can be obtained with MFV 200 using an ROR method as illustrated in FIG. 1A and in accordance with Equation 1, reproduced here:

$$Q_v = V \cdot \frac{d\left(\frac{P_d}{T}\right)}{dt} \quad (1)$$

where V is a known volume of the chamber 204, $P_d$ is a pressure measurement obtained with pressure sensor 212, and T is a temperature measurement obtained with temperature sensor 214.

For flow rates within a second flow range, a flow rate $Q_c$ through critical flow nozzle 202 can obtained with MFV 200 using a CFN method and in accordance with Equation 3, reproduced here:

$$Q_c = C' \cdot A \cdot P_u \sqrt{T} \cdot f(M,\gamma) \quad (3)$$

where $P_u$ is a pressure measurement obtained with pressure sensor 210, T is a temperature measurement obtained with temperature sensor 214, and $f(M,\gamma)$ is a known gas property function based on the gas or gas mixture being tested.

In operation, an initial evacuation procedure can be performed, if necessary, prior to a measurement with either an ROR or CFN method by the controller 230 causing the upstream valve 206 to close and fluid to be removed from MFV 200 by a downstream pump or other means. Upstream valve 206 and downstream valve 208 can then be opened by controller 230, allowing for gas flowing from a device under test (DUT) 250 (e.g., a test MFC) to travel through inlet 216 and outlet 218 of chamber 204. To verify a flow rate by an ROR method, downstream valve 208 can then be closed, causing pressure within chamber 204 to rise over a period of time as temperature (T) and pressure ($P_d$) measurements are obtained. After a time sufficient for flow verification to occur, downstream valve 208 can be opened by controller 230, releasing gas from chamber 204 and allowing normal flow of the gas from the DUT 250 to resume. Alternatively, if a CFN method is applied, a pressure measurement ($P_u$) and temperature (T) measurement are obtained. The pressure and temperature measurements are reported to controller 230, where a verified flow rate can be calculated.

A first flow range can include relatively low flow rates, where, for example, an ROR method may be more accurate and/or where a CFN method cannot be performed because a gas property function is unknown. A second flow range can include relatively high flow rates, where, for example, a CFN method may be more accurate and/or where a gas property function is known. The first and second flow ranges can include overlapping flow rates, and the MFV can select between an ROR measurement and a CFN measurement in a flow verification procedure. For example, where a gas property function is known, the MFV may select a CFN measurement over an ROR measurement as CFN measurements can be obtained more quickly than ROR measurements and without interruption to gas delivery.

Figure 4:
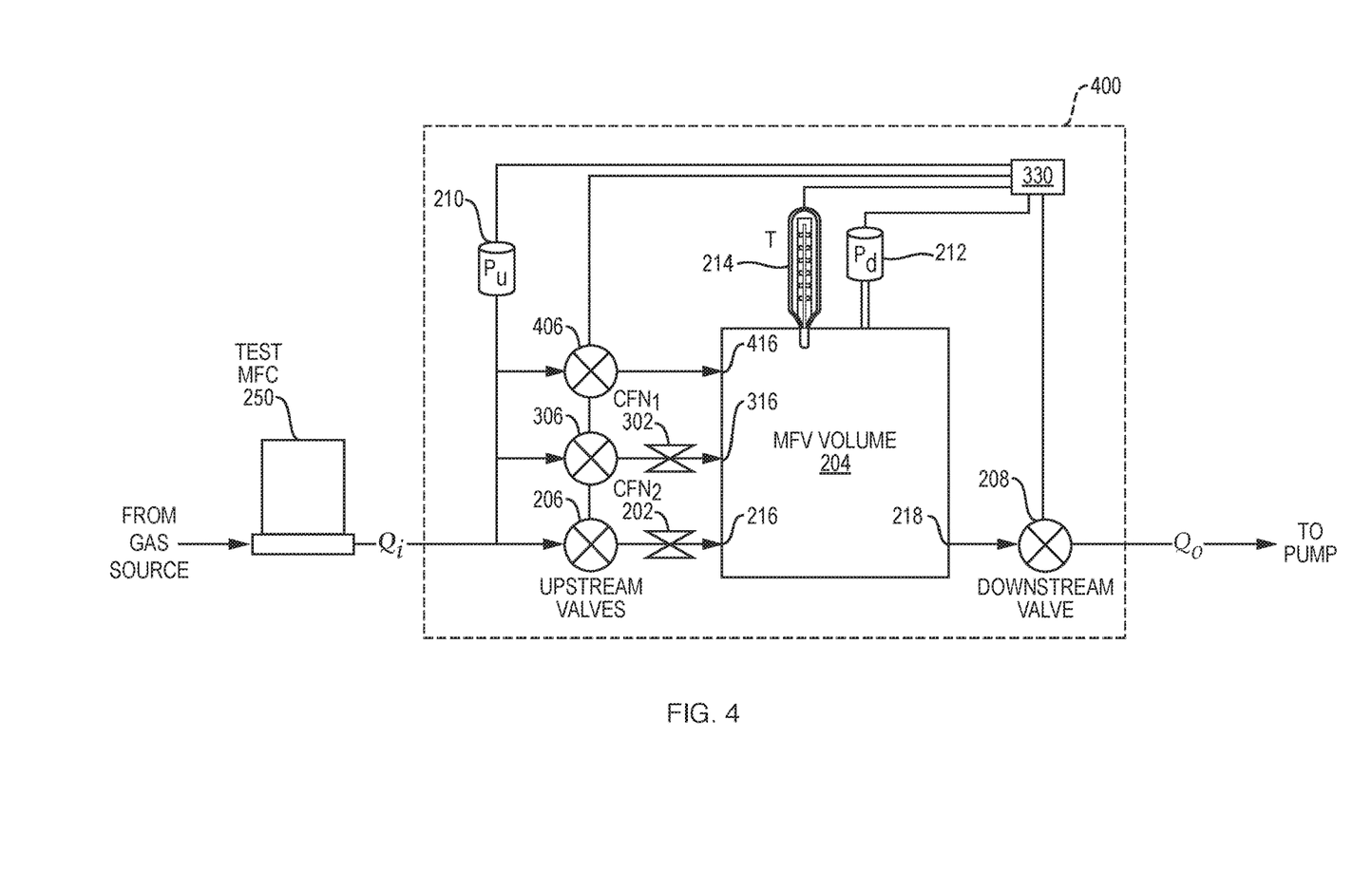
FIG. 4 is a schematic of a mass flow verifier including a channel without a critical flow nozzle, two channels with critical flow nozzles, and a chamber volume.
Figure 5:
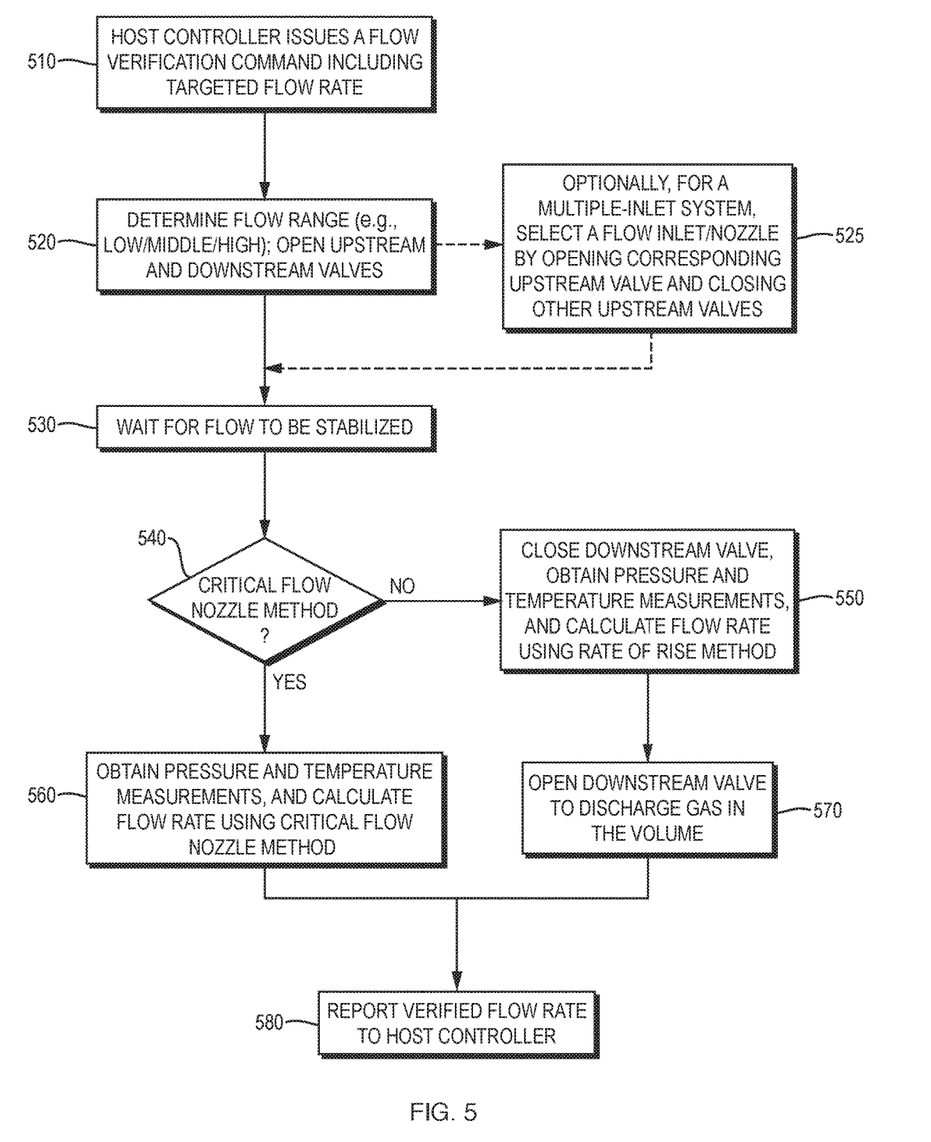
FIG. 5 is a diagram illustrating a flow verification method that includes rate-of-rise and critical flow nozzle measurement methods.

As shown in FIG. 5, upon issuance of a flow verification command from a host controller (step 510), the targeted flow rate can be categorized as one that is either, for example, low (e.g., ROR methods are appropriate), middle (e.g., either ROR or CFN methods are appropriate), or high (e.g., CFN methods are appropriate) (step 520). Additionally, for a multiple inlet device (FIGS. 3-4), an appropriate inlet and/or an appropriately sized critical flow nozzle can be selected based on the targeted flow rate (step 525). After the flow has been allowed to stabilize (step 530), the flow verification process can proceed either by an ROR method or a CFN method (step 540). If an ROR method is selected, a downstream valve in the MFV can be closed, pressure and temperature measurements of fluid within the MFV chamber can be obtained, and the flow rate can be calculated based on a rate of rise in pressure of the fluid (step 550). After the measurements are obtained, the downstream valve can be opened to discharge the fluid from the MFV (step 570). If a CFN method is selected, a pressure measurement of the fluid upstream from the critical flow nozzle in the MFV can be obtained and a flow rate can be calculated (step 560). The flow rate, as verified by either the ROR or CFN method, can then be reported to the host controller (step 580).

As described above, the verification of a flow rate by a CFN method is dependent upon properties of the gas or gas mixture being tested, which may not be known or, if known, may not be accurate. If the gas property information provided during a CFN measurement is inaccurate, the flow verification measurement will likewise be inaccurate.

MFV 200 can advantageously obtain gas property information of the gas being tested by equating a flow through critical flow nozzle 202 with a flow obtained by an ROR measurement in chamber 204. In particular, given a known geometry of the critical flow nozzle 202 and equating a flow rate ($Q_c$) through the nozzle 202 with the flow rate ($Q_v$) through the chamber 204, a gas property function of the gas being tested can be determined as Eq. (2), reproduced here:

$$f(M, \gamma) = V \cdot \frac{\frac{d(P_d/T)}{dt}}{C \cdot A \cdot \sqrt{T} \cdot P_u} \quad (2)$$

During a mass flow verification of a first flow rate, a pressure ($P_u$) upstream of the critical flow nozzle 202 can be obtained along with the pressure ($P_d$) and temperature (T) obtained during the ROR measurement. Thus, a gas property function $f(M,\gamma)$ can be determined from an initial flow verification for the first flow rate and then used in conjunction with CFN methods (e.g., in accordance with Equation 3) for subsequent flow verifications of flow rates in the same or a second flow range. Subsequent mass flow verification procedures can then be carried out more quickly and CFN methods can be applied without independent knowledge of the gas or gas mixture being tested.

Figure 6:
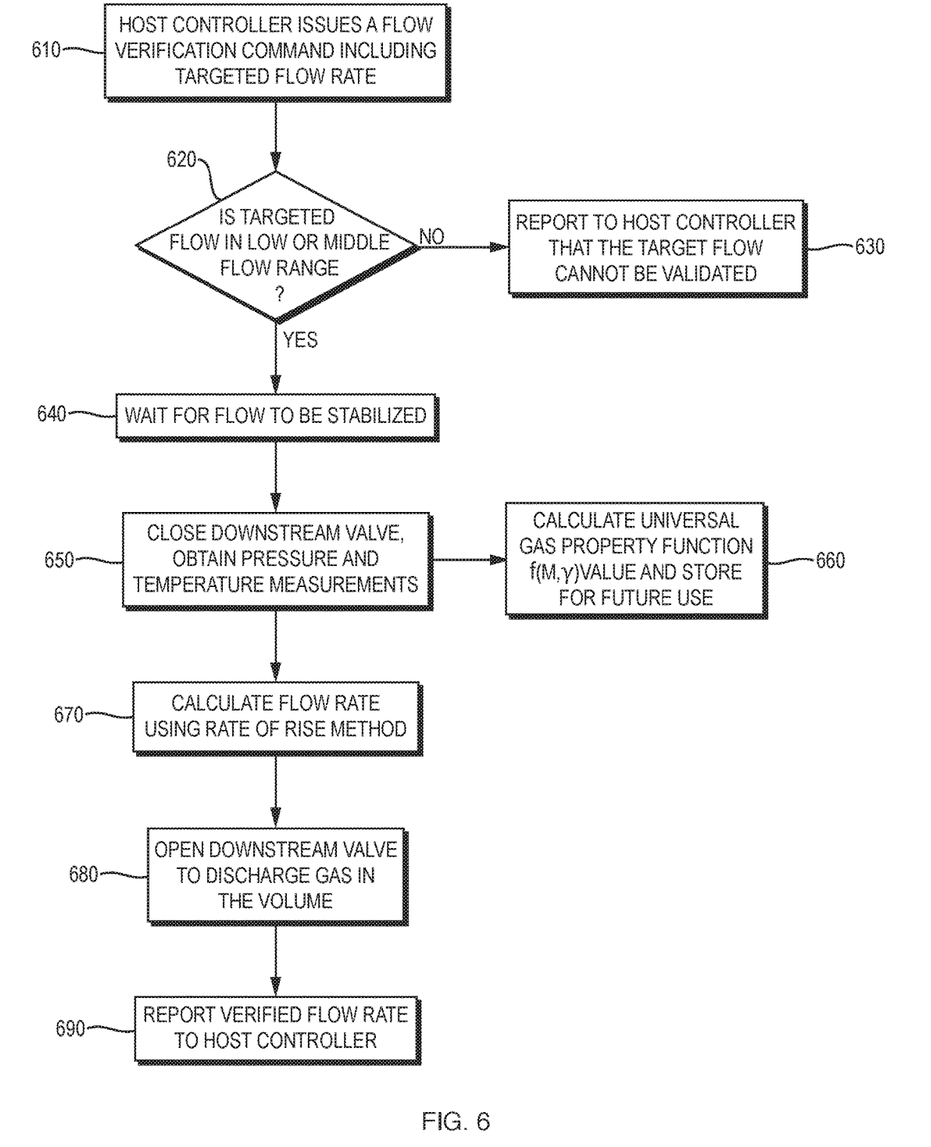
FIG. 6 is a diagram illustrating a flow verification method that includes determining a gas property function.

As shown in FIG. 6, upon an initial flow verification command from a host controller (step 610) where a gas property function is not yet known or it is otherwise desirable to obtain a verified gas property function, a determination can be made as to whether or not the targeted flow rate is within a first flow range that is appropriate for an ROR measurement (step 620). If the targeted flow rate is outside of the first flow range and cannot be validated using an ROR method with the MFV provided, a report to the host controller is made (step 630). Otherwise, the verification process can proceed by allowing the flow to stabilize through a chamber of the MFV (step 640). After the flow has stabilized, a downstream valve in the MFV can be closed and temperature and pressure measurements obtained (step 650). The obtained temperature and pressure measurements can then be used to calculate both a universal gas property function of the gas being tested (step 660) and a flow rate based on a rate of rise in pressure of the fluid (step 670). After the flow rate is calculated, the downstream valve can be opened to discharge the gas from the MFV (step 680) and the verified flow rate can be reported to the host controller (step 690).

For a gas or gas mixture having undergone the process described above with respect to FIG. 6, subsequent verification procedures can involve selection between ROR and CFN methods, as described in FIG. 5.

As critical flow nozzles must be appropriately sized for a flow range in order to provide a choked flow condition for flow rates in that range, multiple critical flow nozzles can be included in one MFV to extend an overall flow verification range of the MFV. For example, multiple critical flow nozzles, each having a different cross sectional area, can be included in one MFV. An appropriate critical flow nozzle of the MFV can be selected for use in a verification procedure based on a targeted flow rate.

Figure 3:
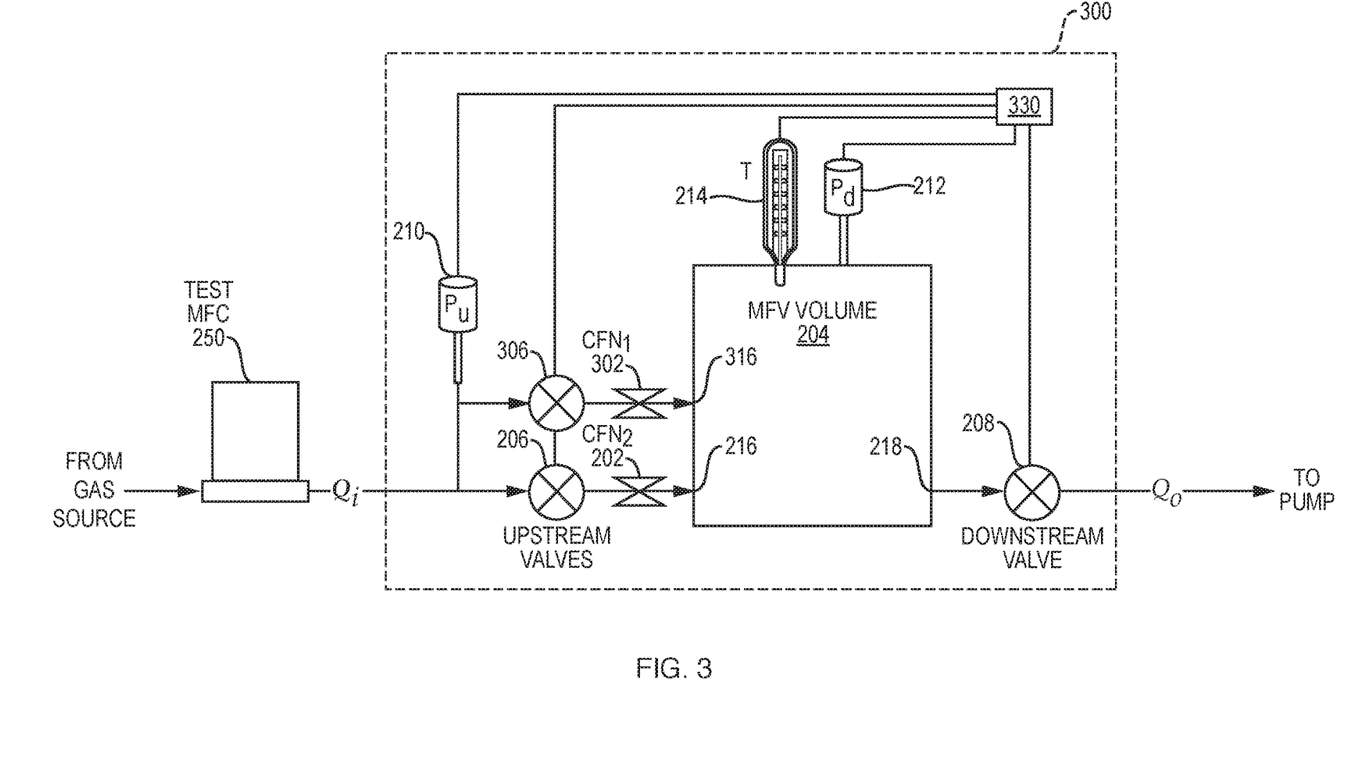
FIG. 3 is a schematic of a mass flow verifier including two critical flow nozzles and a chamber volume.

FIG. 3 illustrates an MFV 300 that includes multiple critical flow nozzles 202, 302 and upstream valves 206, 306. Each upstream valve 206, 306 is associated with an inlet 216, 316 of the chamber 204. While FIG. 3 illustrates an MFV with two critical flow nozzles 202, 302, more than two nozzles can be included. For example, three, four, five, or more critical flow nozzles can be included in one MFV. Also, while FIG. 3 illustrates each valve 206, 306 located upstream of its respective flow nozzle 202, 302, the valves 206, 306 can also be located after the flow nozzles 202, 302 in a flow path to the chamber 204.

Temperature sensor 214, pressure sensors 210, 212, valves 206, 208, 306, and critical flow nozzles 202, 302 can be coupled to controller 330. During a flow verification procedure, a controller 330 can select an appropriate upstream valve (e.g., upstream valve 306) to be opened based on a targeted flow rate, and, if available, a known gas type. All other upstream valves (e.g., upstream valve 206) can be closed during the flow verification procedure, thereby causing gas to flow from DUT 250 through the selected critical flow nozzle (e.g., nozzle 302) to the chamber 204.

As shown in FIG. 3, pressure sensors 210, 212 and temperature sensor 214 can be common to both the critical flow nozzles 202, 302 and to the chamber volume 204, such that each sensor can be used to provide measurements for use with both CFN and ROR methods. Alternatively, separate pressure and temperature sensors can be associated with each component.

Also, a controller configured to select an appropriate critical flow nozzle and/or receive pressure and temperature data can be located internally within the MFV, as illustrated in FIGS. 2-4. Controllers 230, 330 can be configured to receive pressure and temperature signals from any number of pressure and temperature sensors located in the MFV and to control operation of any number of valves. Controllers 230, 330 can be in further communication with a host controller that is associated with a gas metering or monitoring system.

For a flow verification where a CFN method is not required (e.g., a transient analysis), an MFV 400 can include a channel without a critical flow nozzle, as illustrated in FIG. 4. A channel having an upstream valve 406 can be connected to an inlet 416 of chamber 204, allowing a gas to flow directly from the DUT 250 to the chamber 204 when upstream valve 406 is open. As with upstream valves 206 and 306, upstream valve 406 can be coupled to and operated by controller 330.

Generally, an MFV can be configured to verify a flow rate using an ROR method and to obtain a gas property function for flow rates within a first flow range that includes, for example, flow rates of about 1 sccm to about 1000 sccm. The MFV can also be configured to verify a flow rate using a CFN method for flow rates within a second flow range that includes, for example, flow rates of about 1000 sccm to about 50,000 sccm.

However, the flow ranges for which either an ROR or CFN method are applied can vary depending upon factors such as the volume of a chamber within an MFV and the number and size(s) of critical flow nozzles included in the MFV. MFVs can include chambers having volumes of about 1 L, about 2 L, about 3 L, or about 4 L. MFVs can include critical flow nozzles having sizes of about 0.25 mm, 0.50 mm or 0.75 mm. Additionally, an overlapping middle flow range can be defined for which either an ROR or CFN method is appropriate. For example, for an MFV having a chamber volume of about 3 L and a single critical flow nozzle, a low flow range can be defined to include flow rates of about 1 sccm to about 500 sccm, a middle flow range can be defined to include flow rates of about 100 sccm to about 2000 sccm, and a high flow range can be defined to include flow rates of about 1000 sccm to about 50,000 sccm. For such an MFV, an ROR method can initially be selected for a target flow rate within either the low or middle flow range. The critical flow nozzle of the MFV may not be appropriately sized for use with flow rates in the low flow range, and, as such, it may not be possible to obtain a gas property function of the gas during a flow verification procedure of a low flow rate. However, if the target flow rate falls within the middle flow range, a gas property function can be obtained. Once the gas property function is obtained, a CFN method can be selected for subsequent verifications where the target flow rates are within the middle and/or high flow ranges. As CFN methods are capable of providing faster measurements and do not require disruption of gas flow, CFN methods can be preferable over ROR methods once properties of the gas are known.

In addition to providing an extended flow verification range (e.g., 1 sccm to 50,000 sccm), MFVs 200, 300, 400 are also capable of providing external volume insensitivity, as further described in U.S. Pat. No. 7,474,968 and U.S. Pat. No. 7,757,554, the entire contents of which are incorporated herein by reference.

In particular, during ROR measurements, critical flow nozzles (e.g., critical flow nozzles 202, 302) can be configured to maintain the flow rate of a gas through the nozzle constant, thereby minimizing downstream pressure disturbances to a DUT and rendering the MFV substantially insensitive to an external volume between the MFV and the DUT. Provided that a ratio between a chamber pressure ($P_d$) and a pressure upstream of a critical flow nozzle ($P_u$) is less than a critical flow pressure ratio (Equation 5), the downstream pressure of the DUT will not be affected by the rising pressure in the chamber during an ROR measurement. Under such conditions, the accuracy of the ROR measurement is improved and the system does not require the determination of and correction for an external volume, which can be a time-intensive process.

In situations where a gas is known and a multi-inlet MFV is provided (e.g., MFVs 200, 300), controller 230, 330 can select an appropriately-sized critical flow nozzle for use during an ROR measurement such that the ratio between the chamber pressure ($P_d$) and the upstream pressure ($P_u$) does not exceed the critical flow pressure ratio over the duration of the ROR measurement.

Alternatively, in situations where a gas is initially unknown and/or where a single-inlet MFV is provided (e.g., MFV 100), a critical flow nozzle can be sized to provide a critical flow for most gases over at least a short critical flow period. An initial ROR measurement can then be taken of the unknown gas within the short critical flow period. As further described in U.S. Pat. No. 7,474,968, a critical flow period is defined as the period between the moment when the downstream valve is completely shut and the moment when the rising chamber pressure exceeds the critical flow pressure ratio. As such, if the verification time of an ROR measurement is within the critical flow period, the rising chamber pressure does not affect the downstream pressure of the DUT and the flow rate across the nozzle is constant, providing external volume insensitivity. It is known that large molecular weight gases, such as $SF_6$, have larger critical flow periods than those of small molecular weight gases, such as He and $H_2$. Accordingly, an MFV can include a small-sized critical flow nozzle and a controller configured to obtain an initial ROR measurement over a short verification time that falls within the critical flow period for even small molecular weight gases.

Once a gas property function is determined, in multi-inlet MFVs subsequent ROR measurements can be performed with use of a differently sized critical flow nozzle to provide for longer critical flow periods and thereby further improve flow verification accuracy.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A mass flow verifier comprising:
   a chamber configured to receive a fluid;
   a critical flow nozzle in serial fluid connection with the chamber upstream of the chamber;
   a first pressure sensor that detects fluid pressure in the chamber;
   a second pressure sensor that detects fluid pressure upstream of the critical flow nozzle; and
   a controller configured to verify flow rate of the fluid by:
   (i) at a first flow range, measuring a first flow rate based on a rate of rise in pressure of the fluid as detected by the first pressure sensor and determining a gas property function of the fluid based on pressures as detected by the first pressure sensor and the second pressure sensor, and (ii) at a second flow range, measuring a second flow rate based on pressure detected by the second pressure sensor and the determined gas property function.

2. The mass flow verifier of claim 1 wherein the controller is further configured to select between obtaining a rate of rise measurement and a critical flow nozzle measurement for verifying subsequent flow rates of the fluid.

3. The mass flow verifier of claim 2 wherein the controller is configured to select obtaining a rate of rise measurement for low flow rates.

4. The mass flow verifier of claim 3 wherein the low flow rate includes a range of flow rates of about 1 sccm to about 1000 sccm.

5. The mass flow verifier of claim 2 wherein the controller is configured to select obtaining a critical flow nozzle measurement for high flow rates.

6. The mass flow verifier of claim 5 wherein the high flow rate includes a range of flow rates of about 1,000 sccm to about 50,000 sccm.

7. The mass flow verifier of claim 1 wherein the first flow range and the second flow range include overlapping flow rates.

8. The mass for verifier of claim 1 wherein the controller is further configured to calculate the gas property function based on a temperature of the fluid and known geometry of the critical flow nozzle.

9. The mass flow verifier of claim 1 wherein the controller is configured to calculate the first flow rate $Q_v$ according to a rate of rise measurement, as given by the following:

$$f(M, \gamma) = V \cdot \frac{\frac{d(P_d/T)}{dt}}{C' \cdot A \cdot \sqrt{T} \cdot P_u}$$

where V is a volume of the chamber, $P_d$ is the detected pressure of the fluid in the chamber, and T is a detected temperature of the fluid.

10. The mass flow verifier of claim 9 wherein the controller is further configured to determine the gas property function $f(M,\gamma)$ based on a molecular weight M and a specific heat ratio $\gamma$ of the fluid according to the following:

$$Q_v = V \cdot \frac{d\left(\frac{P_d}{T}\right)}{dt}$$

where $P_u$ is the detected pressure of the fluid upstream of the critical flow nozzle, C' is a discharge coefficient of the critical flow nozzle, and A is a cross-sectional area of the throat of the critical flow nozzle.

11. The mass flow verifier of claim 10 wherein the controller is configured to calculate the second flow rate $Q_c$ according to a critical flow nozzle measurement, as given by the following:

$$Q_c = C' \cdot A \cdot P_u \cdot \sqrt{T} \cdot f(M,\gamma).$$

12. The mass flow verifier of claim 1 further comprising a downstream valve located at an outlet of the chamber, wherein the controller is further configured to close the downstream valve causing fluid pressure within the chamber to rise.

13. The mass flow verifier of claim 1 further comprising a temperature sensor and wherein the first and second flow rates are further based on a detected temperature of the fluid.

14. The mass flow verifier of claim 1, wherein the chamber volume is about 3 L or less.

15. The mass flow verifier of claim 1, wherein the chamber volume is about 1 L or less.

16. The mass flow verifier of claim 1 further comprising a plurality of parallel critical flow nozzles in fluid connection with the chamber, at least two critical flow nozzles having different cross-sectional throat areas.

17. The mass flow verifier of claim 16 wherein the controller is further configured to selectively activate one of the plurality of critical flow nozzles by opening an upstream valve associated with the selected critical flow nozzle and closing upstream valves associated with other critical flow nozzles.

18. The mass flow verifier of claim 1 wherein the critical flow nozzle is configured to provide external volume insensitivity during measurement of the first flow rate.

19. The mass flow verifier of claim 1 wherein the controller is configured to measure the first flow rate within a critical flow period.

20. A method of verifying a flow rate comprising:
for a flow rate in a first flow range, introducing a fluid into a chamber of a mass flow verifier, detecting pressure of the fluid in the chamber over time, and calculating the first flow rate based on a rate of rise in pressure of the fluid in the chamber;
determining a gas property function of the fluid based on pressures as detected by the first pressure sensor and the second pressure sensor; and
for a flow rate in a second flow range, detecting pressure of the fluid upstream of a critical flow nozzle of the mass flow verifier and calculating the second flow rate based on the detected upstream pressure and the determined gas property function.

21. The method of claim 20 wherein the fluid is an unknown gas or mixture of gases.

22. The method of claim 20 further comprising selecting between obtaining a rate of rise measurement and a critical flow nozzle measurement for measuring subsequent flow rates of the fluid.

23. The method of claim 22 wherein obtaining a rate of rise measurement is selected for a low flow rate and obtaining a critical flow nozzle measurement is selected for a relatively high flow rate.

24. The method of claim 20 further comprising selecting among a plurality of critical flow nozzles for measuring subsequent flow rates of the fluid.

25. The method of claim 20 wherein detecting pressure of the fluid in the chamber occurs within a critical flow period.

26. A method of increasing an operational flow range of a mass flow verifier comprising:
for low flow rates, utilizing a rate of rise method to determine a flow rate of a fluid;
for middle flow rates, utilizing a rate of rise method to determine a flow rate of the fluid and determining a gas property function of the fluid; and
for high flow rates, utilizing a critical flow nozzle method with the determined gas property function to determine flow rate of the fluid.

27. A mass flow verifier comprising:
a chamber configured to receive a fluid;
a critical flow nozzle in fluid connection with the chamber;
a first pressure sensor that detects fluid pressure in the chamber;
a second pressure sensor that detects fluid pressure upstream of the critical flow nozzle; and
a controller configured to verify flow rate of the fluid by:
  (i) at a first flow range, measuring a first flow rate based on a rate of rise in pressure of the fluid as detected by the first pressure sensor, and
  (ii) at a second flow range, measuring a second flow rate based on pressure detected by the second pressure sensor.

28. A method of verifying a flow rate comprising:
for a flow rate in a first flow range, introducing a fluid into a chamber of a mass flow verifier, detecting pressure of the fluid in the chamber over time, and calculating the first flow rate based on a rate of rise in pressure of the fluid in the chamber; and
for a flow rate in a second flow range, detecting pressure of the fluid upstream of a critical flow nozzle of the mass flow verifier and calculating the second flow rate based on the detected upstream pressure.

* * * * *

UNITED STATES PATENT AND TRADEMARK OFFICE
CERTIFICATE OF CORRECTION

PATENT NO. : 10,031,004 B2  
APPLICATION NO. : 15/380682  
DATED : July 24, 2018  
INVENTOR(S) : Junhua Ding, Michael L'Bassi and Wayne Cole Page 1 of 1

It is certified that error appears in the above-identified patent and that said Letters Patent is hereby corrected as shown below:

Column 11, Claim 9, the formula should read:

$$Q_v = V \cdot \frac{d(\frac{P_g}{T})}{dt}$$

Column 11, Claim 10, the formula should read:

$$f(M,\gamma) = V \cdot \frac{\frac{d(P_g/T)}{dt}}{C' \cdot A \cdot \sqrt{T} \cdot P_u}$$

Column 11, Claim 11, the formula should read:

$$Q_s = C' \cdot A \cdot P_u \cdot \sqrt{T} \cdot f(M,\gamma).$$

Signed and Sealed this  
Fourth Day of June, 2019

Andrei Iancu  
*Director of the United States Patent and Trademark Office*

UNITED STATES PATENT AND TRADEMARK OFFICE
CERTIFICATE OF CORRECTION

PATENT NO. : 10,031,004 B2
APPLICATION NO. : 15/380682
DATED : July 24, 2018
INVENTOR(S) : Junhua Ding, Michael L'Bassi and Wayne Cole Page 1 of 1

It is certified that error appears in the above-identified patent and that said Letters Patent is hereby corrected as shown below:

In the Specification

Column 5, Line 60, the formula should read:

$$Q_c = C' \cdot A \cdot P_u \cdot \left(\frac{R \cdot T}{M} \frac{2\gamma}{\gamma+1}\right)^{1/2} \cdot \left(\frac{2}{\gamma+1}\right)^{1/(\gamma-1)}$$

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*